(12) United States Patent
Onishi et al.

(10) Patent No.: US 12,026,869 B2
(45) Date of Patent: Jul. 2, 2024

(54) PAVEMENT CONDITION RATING METHOD

(71) Applicant: Central Nippon Expressway Company Limited, Nagoya (JP)

(72) Inventors: Atsushi Onishi, Nagoya (JP); Toshiyuki Mori, Nagoya (JP); Toshiyuki Oka, Nagoya (JP); Toshiki Sakakibara, Nagoya (JP)

(73) Assignee: CENTRAL NIPPON EXPRESSWAY COMPANY LIMITED, Nagoya (JP)

( * ) Notice: Subject to any disclaimer, the term of this patent is extended or adjusted under 35 U.S.C. 154(b) by 404 days.

(21) Appl. No.: 17/367,192

(22) Filed: Jul. 2, 2021

(65) Prior Publication Data

US 2022/0284557 A1  Sep. 8, 2022

(30) Foreign Application Priority Data

Mar. 2, 2021 (JP) .................. 2021-032798

(51) Int. Cl.
*G06T 7/00* (2017.01)

(52) U.S. Cl.
CPC ............. *G06T 7/001* (2013.01); *G06T 7/97* (2017.01); *G06T 2207/20081* (2013.01)

(58) Field of Classification Search
CPC .. G06T 7/001; G06T 7/97; G06T 2207/20081
See application file for complete search history.

(56) References Cited

FOREIGN PATENT DOCUMENTS

| JP | 6678267 | B1 |   | 3/2020 |
|---|---|---|---|---|
| JP | 6678267 | B1 | * | 4/2020 |
| JP | 2021170298 | A | * | 10/2021 |

OTHER PUBLICATIONS

Majidifard, H., Jin, P., Adu-Gyamfi, Y., & Buttlar, W. G. (2020). Pavement image datasets: A new benchmark dataset to classify and densify pavement distresses. Transportation Research Record, 2674(2), 328-339. (Year: 2020).*

Majidifard, H., Adu-Gyamfi, Y., & Buttlar, W. G. (2020). Deep machine learning approach to develop a new asphalt pavement condition index. Construction and building materials, 247, 118513. (Year: 2020).*

* cited by examiner

*Primary Examiner* — Bobbak Safaipour
*Assistant Examiner* — Ashley L. Hytrek
(74) *Attorney, Agent, or Firm* — Wentsler LLC

(57) ABSTRACT

By using a plurality of images obtained by combining image of damage included in a road surface still image based on perspective and definitions of the damage as damage learning data, an object detection model is built. A plurality of data wherein the number of rectangles in an analysis result image displaying the rectangles surrounding the damage output as an analysis result of the object detection model and a pavement condition rating result obtained by visual inspection of the analysis result image of the object detection model are combined is used as condition rate learning data to build a rating estimation model, and pavement condition is rated using the rating estimation model.

1 Claim, 3 Drawing Sheets

| | Filename | count_Crack_Open | count_Crack_Seal | count_Crack_Tight | Count_Patching | count_Spalling | count_Alligator_crack | count_Block_Crack |
|---|---|---|---|---|---|---|---|---|
| 1 | | | | | | | | |
| 2 | photo_001.jpg | 15 | 0 | 0 | 0 | 0 | 50 | 2 |
| 3 | photo_002.jpg | 2 | 0 | 8 | 11 | 0 | 40 | 0 |
| 4 | photo_003.jpg | 28 | 0 | 1 | 4 | 0 | 40 | 0 |
| 5 | photo_004.jpg | 51 | 0 | 14 | 0 | 0 | 34 | 0 |
| 6 | photo_005.jpg | 63 | 0 | 5 | 0 | 0 | 38 | 20 |
| 7 | photo_006.jpg | 35 | 0 | 153 | 6 | 24 | 0 | 0 |
| 8 | photo_007.jpg | 44 | 0 | 20 | 1 | 14 | 0 | 0 |
| 9 | photo_008.jpg | 13 | 0 | 35 | 4 | 31 | 0 | 0 |
| 10 | photo_009.jpg | 51 | 0 | 49 | 0 | 0 | 0 | 6 |
| 11 | photo_010.jpg | 6 | 0 | 84 | 0 | 0 | 7 | 6 |
| 12 | photo_011.jpg | 62 | 2 | 2 | 4 | 6 | 2 | 3 |
| 13 | photo_012.jpg | 24 | 1 | 1 | 7 | 0 | 6 | 18 |
| 14 | photo_013.jpg | 13 | 0 | 8 | 0 | 0 | 49 | 0 |
| 15 | photo_014.jpg | 41 | 1 | 0 | 7 | 12 | 0 | 0 |
| 16 | photo_015.jpg | 17 | 0 | 0 | 0 | 22 | 0 | 0 |
| 17 | photo_016.jpg | 17 | 0 | 1 | 1 | 16 | 0 | 0 |
| 18 | photo_017.jpg | 63 | 17 | 28 | 2 | 3 | 0 | 62 |
| 19 | photo_018.jpg | 60 | 2 | 42 | 0 | 0 | 0 | 100 |
| 20 | photo_019.jpg | 29 | 5 | 34 | 1 | 0 | 0 | 65 |
| 21 | photo_020.jpg | 63 | 20 | 29 | 0 | 0 | 0 | 93 |
| 22 | photo_021.jpg | 85 | 6 | 13 | 5 | 0 | 0 | 19 |
| 23 | photo_022.jpg | 4 | 0 | 8 | 2 | 5 | 0 | 0 |
| 24 | photo_023.jpg | 43 | 3 | 12 | 2 | 5 | 0 | 0 |
| 25 | photo_024.jpg | 28 | 0 | 0 | 6 | 16 | 0 | 0 |

FIG. 3

PAVEMENT CONDITION RATING METHOD

BACKGROUND OF THE INVENTION

1. Field of the Invention

The present invention relates to a pavement condition rating method for rating the state of pavement as condition based on damage occurring on pavement of a road.

2. Description of Related Art

Recently, various techniques have been proposed to detect damage occurring on pavement of roads based on road surface images by utilizing image analysis by arithmetic processing equipment. For example, in Japanese Patent No. 6,678,267 publication, road defect detection apparatus has been proposed. According to the apparatus, pixel region including a failure of the road are detected from a series of images photographing the road ahead or behind based on perspective, and failure rate of the road for each section are calculated using the sum of the area of the detected pixel region.

BRIEF SUMMARY OF THE INVENTION

Problems to be Solved

The road surface image of the road as an object to detect the damage is obtained by extracting from the acquired moving image traveling while photographing the road surface of the road, the road surface image becomes based on the perspective, comparing at a location away from the shooting point and a location close to, because the pixel area for the photographed area of the actual becomes smaller as the distance become farther, there is a problem that the accuracy of detecting damage is reduced. Further, since the pixel area relative to the photographing area of actual place is different according to the distance from the shooting point, even if the pixel area wherein damage detected is the same, difference from the actual damaged area is caused depending on the positional relationship with the shooting point, and therefore, by using only the numerical data of the pixel area it has been difficult to perform the condition determination of the road surface.

In contrast, as in the above road defect detection apparatus, it is also conceivable to consider only damage of point near from the shooting point in the road surface image as detection target, however, in this case, the image area that can be used for detection of damage become such area that the perspective distance at the road surface image and actual distance can be taken matching, that is, a limited area such as a flat straight section, and there were difficult place (e.g., a curved point of the road) to be applied. Moreover, since it is only a part that can be used for detecting damage in the image area of the road surface included in each road surface image, image analysis of many road surface images is required, there is a problem that it takes time to detect damage.

Furthermore, when detecting damage from the road surface image based on perspective, it is possible to reduce the damage erroneous detection by fixing the angle of view of the image to be utilized to a determined value, however, for that purpose, it is necessary to calibrate when attaching the photographing equipment to the vehicle, and there is a problem that requires time and effort. Further, even if the calibration was performed, since the longitudinal and transverse slopes of the road are not uniform and continuously change during running, there is a possibility that lead to damage erroneous detection by constantly changing the angle of view during shooting. Further, when attempting to determine the condition of the road surface from the damage detection result, since the relationship between the photographed area and the pixel area is constantly changed by the change of the angle of view, it has been difficult to determine the condition of the road surface with numerical data of the image area.

An object of the present invention is to provide a pavement condition rating system which utilizes a road surface image based on perspective and which is extracted from a moving image obtained by traveling while photographing a road surface of a road, makes it possible to use the whole of an image area of a road surface included in a road surface image for detection of damage, and is less susceptible to damage erroneous detection.

Means for Solving the Problems

In the pavement condition rating method according to the present invention, a plurality of images obtained by combining image of damage included in a road surface still image based on perspective and definitions of the damage are used as damage learning data, and an object detection model for performing image analysis wherein an image wherein an object detected in an analysis target image is surrounded by a rectangle is output as an analysis result is built using the damage learning data. Then, it is characterized in that damage included in a road surface still image based on perspective is detected using the object detection model, a plurality of data wherein the number of rectangles in an analysis result image displaying the rectangles surrounding the damage output as an analysis result and a pavement condition rating result obtained by visual inspection of the analysis result image are combined are used as condition rate learning data to build a rating estimation model, and the pavement condition is rated using the rating estimation model.

The damage learning data may comprising a plurality of types of the damage, and a plurality of the analysis result images used for obtaining the pavement condition rating result and the number of the rectangles composing the condition rate learning data may have a standard deviation of a sum of the number of the rectangles for each type of the damage in each of the analysis result images exceeding 20.

There are no restrictions on the type of damage, but for example, the following types can be adopted.
Open Crack: Which having slightly larger crack width.
Crack Seal: Mark of crack closed by repair.
Tight Crack: Which having narrow crack width.
Patching: Mark of damaged area where been repaired.
Spalling: Peeling off of pavement surface.
Alligator Crack: A group of small cracks that form a honeycomb.
Block crack: Connected cracks forming a relatively large polygon.

Effects of the Invention

In the pavement condition rating method according to the present invention, since an image analysis is performed wherein an image wherein an object detected in an analysis target image is surrounded by a rectangle is output as an analysis result, a plurality of data wherein the number of rectangles in an analysis result image displaying the rectangles surrounding the damage output as an analysis result and a pavement condition rating result obtained by visual inspection of the analysis result image are combined are used as condition rate learning data to build a rating estimation model, and the pavement condition is rated using the rating estimation model, it is only necessary to confirm the presence or absence of the damage, and it is not necessary to specify the shape of the damage. Therefore, the image area at a location away from the shooting point of the road surface image based on perspective can also be used for detection of damage.

Further, as the number of rectangles detected in the analysis result image used for creating the condition rate learning data increases, the significance of each rectangle in the entire condition rate learning data decreases, so that even if accidental damage erroneous detection occurs in a certain damage segment, the damage erroneous detection does not have a significant effect in terms of estimation. That is, it is hardly affected by the damage erroneous detection.

The damage learning data comprises a plurality of types of damage, and the plurality of analysis result images used for obtaining the pavement condition rating result and the number of rectangles composing the condition rate learning data are set so that the standard deviation of the sum of the number of rectangles for each type of damage in each of the analysis result images exceeds 20, whereby the number of rectangles detected in the analysis result image can be set to a range wherein the damage erroneous detection does not have a significant effect in terms of estimation.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 3 is a diagram showing an example of a rectangle number data.

DETAILED DESCRIPTION OF THE INVENTION

Mode for Carrying Out the Invention

Figure 1:
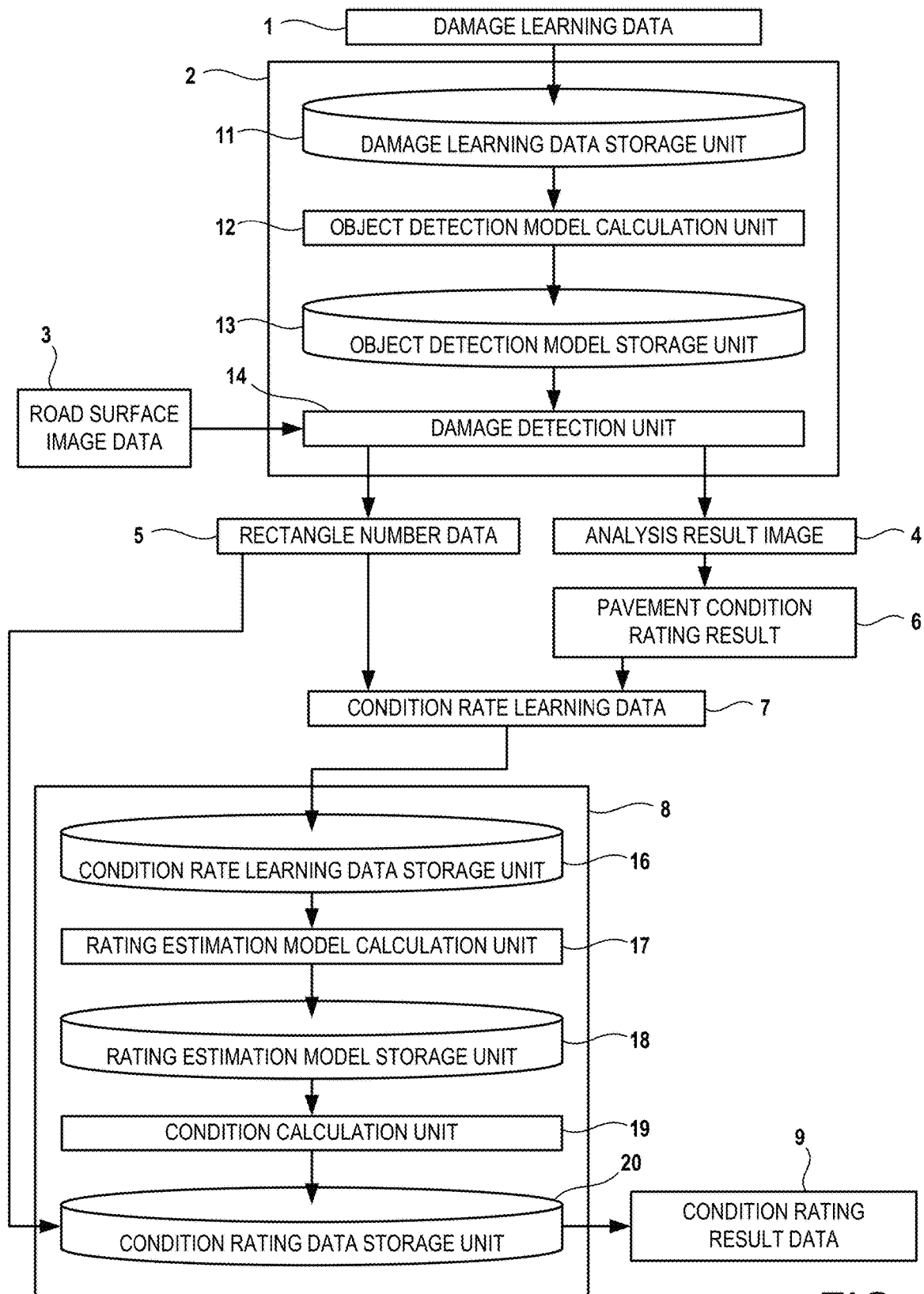
FIG. 1 is a block diagram showing an outline of an embodiment of the pavement condition rating method according to the present invention.

Embodiments of the pavement condition rating method according to the present invention will be described with reference to the drawings. In an embodiment, an object detection model for performing image analysis for outputting an image wherein an object detected in an analysis target image is surrounded by a rectangle as an analysis result, and a rating estimation model for performing pavement condition rating based on the analysis result image are used.

Although the use of an open source YOLOv4 is assumed for image analysis, other known machine-learning models may be used for image analysis.

The object detection model is built by machine learning wherein a plurality of pieces of image data obtained by combining the image of the damage and the definition of the damage included in the road surface still image based on the perspective are used as the damage learning data 1.

The damage learning data 1 is a combination of an image of a damage included in a road surface still image based on the perspective and a definition of the damage. In this embodiment, the damage is divided into seven, i.e., open crack, crack seal, tight crack, patching, spalling, alligator crack, and block crack, and by tagging the names corresponding to the images of these damages, a plurality of data wherein the definition of the damage image and the damage is combined is created. The data is stored and accumulated in the damage learning data storage unit 11 of the arithmetic processing unit (hereinafter referred to as "first arithmetic processing unit 2") for performing image analysis.

The first arithmetic processing unit 2 includes a keyboard, a screen, a communication cable, and the like, for inputting and outputting necessary data, but all of these equipment are not shown because they are well known.

In the first arithmetic processing unit 2, the object detection model is built by the object detection model calculation unit 12 based on the damage learning data 1 stored and accumulated in the damage learning data storage unit 11. The built model is stored in the object detection model storage unit 13. Note that, when there is an addition or update of the data wherein the image of the damage and the definition of the damage are combined, which constitutes the damage learning data 1, the model is rebuilt each time, and the version of the rebuilt model is updated and stored in the object detection model storage unit 13.

Figure 2:
FIG. 2 is a photograph showing an example of the analysis result image.

The object detection model stored in the object detection model storage unit 13 is used in the damage detection unit 14 which executes the analysis processing of the road surface image data 3 to be analyzed, and the damage detection unit 14 outputs an analysis result image 4 wherein the detected damage is surrounded by a rectangle as an analysis result. FIG. 2 shows an example of an analysis result image.

The damage detection unit 14 also outputs data of the number of rectangles in the analysis result image 4 (rectangle number data 5) together with the analysis result image 4. FIG. 3 shows an example of the rectangle number data. In FIG. 3, the portion surrounded by a broken line is the number of rectangles for each of the seven sections of damage. In the table shown in FIG. 3, the file names of the analysis result images 4 in which the numbers of rectangles are calculated are also displayed. (The leftmost column of the table shown in FIG. 3) In FIG. 3, "Crack_Open" means open crack, "Crack_Seal" means crack seal, "Crack Tight" means tight crack, "Patching" means patching, "Spalling" means spalling, "Aligator_Crack" means alligator crack, and "Block_Crack" means block crack.

The plurality of pieces of rectangle number data 5 are combined with the pavement condition rating result 6 obtained by visual inspection of the analysis result image 4 to form condition rate learning data 7.

As a method for rating the pavement condition by visual inspection of the analysis result images 4, for example, PASER Manual method established by the U.S. University of Wisconsin can be adopted. In this case, the pavement condition rating result 6 is determined in 10 stages. However, there is no limitation on the condition determination method and the number of stages of condition determination, and an appropriate method may be adopted in consideration of the state, properties, and the like of the road surface to be rated.

The created condition rate learning data 7 is stored and accumulated in the condition rate learning data storage unit 16 of the arithmetic processing unit (hereinafter referred to as "second arithmetic processing unit 8") for performing the pavement condition rating.

In this embodiment, the image analysis and the condition rating are performed by different arithmetic processing units, but they may be performed by a single arithmetic processing unit.

The rating estimation model is built by machine learning performed by the rating estimation model calculation unit 17 using the condition rate learning data 7 stored and accumulated in the condition rate learning data storage unit 16 in the second arithmetic processing unit 8. The built model is stored in the rating estimation model storage unit 18. When the data composing the condition rate learning data 7 is added or updated, the model is rebuilt each time, and the version of the rebuilt model is updated and stored in the rating estimation model storage unit 18.

The rating estimation model stored in the rating estimation model storage unit 18 is used in a condition calculation unit 19 that executes rate and analysis processing based on the number of rectangles in the analysis result image 4 (the rectangle number data 5), and the condition calculation unit 19 outputs condition rating result data 9 including a stage in the stage rate of the pavement condition defined in advance as an analysis result. In this embodiment, the condition rating result data 9 is output from the second arithmetic processing unit 8 through the accumulation and storage process in the condition rating data storage unit 20, but the accumulation and storage process and the output may be executed simultaneously, or the output condition rating result data 9 may be accumulated and stored in another storage device.

Examples

Building an Object Detection Model

Damage learning data were prepared by dividing a plurality of images of damage obtained as a result of on-road inspection work into seven of open cracks, crack seals, tight cracks, patching, spalling, alligator cracks, and block cracks due to damage contained in the images, and tagging damage segments corresponding to each image. Then, using the damaged learned data, object detection models were built using YOLOv4.

Acquirement of Rectangle Number Data

A plurality of road surface still images based on perspective were extracted from a moving image obtained by traveling a vehicle equipped with an imaging device, and for a part of those road surface still images, damage analysis by the above-mentioned object detection model was executed to obtain rectangle number data. In order to confirm how the performance of the rating estimation models changes when the number of detected rectangles differs, three types of rectangle number data in which the number of detected rectangles differed for each of the images subjected to the analysis were acquired by changing the threshold value of the confidence level (hereinafter referred to as the "CL threshold value") used in the damage analysis.

Creation of Condition Rate Learning Data

Each of the analysis result images obtained at the time of acquisition of the rectangle number data was visually rated by a technician, and condition rate learning data wherein the number of rectangles and the pavement condition rating result were combined was created. The same pavement condition rating result was used for three types of data sets having different numbers of detected rectangles.

The condition rating was based on a four-level rating wherein the 10-level rating of PASER Manual was transformed by focusing on the damaged stage wherein the repairing methods greatly changed. Table 1 shows the relation between the 10-step rating of PASER Manual and the 4-step rating of this embodiment.

TABLE 1

| PASER Manuall 10-step rating | | Repairing methods | 4-step rating of this embodiment |
|---|---|---|---|
| 10 | Excellent | No maintenance required | 1 |
| 9 | Excellent | No maintenance required | Very Good |
| 8 | Very Good | No maintenance required | |
| 7 | Good | Maintain with routine sealing procedure/follow-up | 2 |
| 6 | Good | Maintain with routine sealing procedure/follow-up | Good |
| 5 | Fair | Crack repair/Overlay/Partial patching | 3 |
| 4 | Fair | Crack repair/Overlay/Partial patching | Fair |
| 3 | Poor | Rebuild the main part/Reconstruction | 4 |
| 2 | Very Poor | Rebuild the main part/Reconstruction | Poor |
| 1 | Failed | Rebuild the main part/Reconstruction | |

Build of Rating Estimation Model

Using the above-mentioned three types of condition rate learning data, an ensemble model consisting of three different types of machine learning models was used to build a rating estimation model (Examples 1, 2, and 3).

Condition Rating Using Rating Estimation Model

A part of the rectangle number data which was not used for the creation of the condition rate learning data was rated for condition by the rating estimation model described above. In addition, the technician performed the condition rating by visual recognition on each of the analysis result images corresponding to the rectangle number data for which the condition rating was performed. Then, comparison and verification of the condition rating by the rating estimation model and the condition rating by the visual recognition of the technician were carried out. Table 2 shows the total number of rectangles in the rectangle number data composing the condition rate learning data and the results of the comparison and verification together with the standard deviation of the number of rectangles for each of the damaged segments.

TABLE 2

| | | Example 1 | Example 2 | Example 3 |
|---|---|---|---|---|
| Coefficient of determination | | 0.643 | 0.536 | 0.511 |
| Absolute value error | | 0.264 | 0.418 | 0.442 |
| Number of rectangles reflected in the rating | | 16401 | 6169 | 677 |
| Standard deviation of number of rectangle | Open Crack | 23.81 | 12.43 | 1.50 |
| | Crack Seal | 55.89 | 30.40 | 6.37 |
| | Tight Crack | 46.28 | 12.30 | 0.48 |
| | Patching | 2.93 | 1.26 | 0.71 |
| | Spalling | 11.76 | 4.97 | 1.39 |
| | Alligator Crack | 10.86 | 4.74 | 1.56 |
| | Block Crack | 17.09 | 7.10 | 1.56 |
| | Average | 24.09 | 10.46 | 1.94 |

In Table 2, the coefficient of determination is the difference between the condition rating based on the rating estimation model and the condition rating based on the visual recognition of the technician, and becomes 1 when they are perfectly matched. The absolute value error is an error with respect to the condition rating by visual recognition of a technician in the condition rating by the rating estimation model. It was confirmed that the determination coefficient and the absolute value error can be improved by adjusting the CL threshold value and increasing the number of rectangles reflected in the rating. When adjusting the CL threshold value, it is preferable that the standard deviation of the sum of the number of rectangle for each of the damage segments (average of all damage segments) exceeds 20, which rectangle surrounds the damage of the image displayed by the road surface damage detection data to be rated.

DESCRIPTION OF SYMBOLS

1 Damage learning data
2 First arithmetic processing unit
3 Road surface image data
4 Analysis result image
5 Rectangle number data
6 Pavement condition rating result
7 Condition rate learning data
8 Second arithmetic processing unit
9 Condition rating result data
11 Damage learning data storage unit
12 Object detection model calculation unit
13 Object detection model storage unit
14 Damage detection unit
16 Condition rate learning data storage unit
17 Rating estimation model calculation unit
18 Rating estimation model storage unit
19 Condition calculation unit
20 Condition rating data storage unit

What is claimed is:

1. A pavement condition rating method wherein:
a plurality of images obtained by combining image of damage included in a road surface still image based on perspective and definitions of the damage are used as damage learning data,
an object detection model for performing image analysis wherein an image wherein an object detected in an analysis target image is surrounded by a rectangle is output as an analysis result is built using the damage learning data,
damages included in a road surface still image based on perspective are detected using the object detection model,
a plurality of data wherein the number of rectangles in an analysis result image displaying the rectangles surrounding the damage output as an analysis result and a pavement condition rating result obtained by visual inspection of the analysis result image are combined is used as condition rate learning data to build a rating estimation model,
and pavement condition is rated using the rating estimation model, wherein the damage learning data comprises a plurality of types of the damage, and a plurality of the analysis result images used for obtaining the pavement condition rating result and the number of the rectangles composing the condition rate learning data have a standard deviation of a sum of the number of the rectangles for each type of the damage in each of the analysis result images exceeding 20.

* * * * *